United States Patent
Brown et al.

(10) Patent No.: US 11,165,803 B2
(45) Date of Patent: Nov. 2, 2021

(54) SYSTEMS AND METHODS TO SHOW DETAILED STRUCTURE IN A SECURITY EVENTS GRAPH

(71) Applicant: Netskope, Inc., Santa Clara, CA (US)

(72) Inventors: Nigel Derek Brown, Ottery St. Mary (GB); Raymond Joseph Canzanese, Jr., Philadelphia, PA (US)

(73) Assignee: Netskope, Inc., Santa Clara, CA (US)

( * ) Notice: Subject to any disclaimer, the term of this patent is extended or adjusted under 35 U.S.C. 154(b) by 286 days.

(21) Appl. No.: 16/361,039

(22) Filed: Mar. 21, 2019

(65) Prior Publication Data
US 2019/0379684 A1  Dec. 12, 2019

Related U.S. Application Data

(60) Provisional application No. 62/683,789, filed on Jun. 12, 2018.

(51) Int. Cl.
*H04L 29/06* (2006.01)
*G06F 16/901* (2019.01)

(52) U.S. Cl.
CPC ...... *H04L 63/1425* (2013.01); *G06F 16/9024* (2019.01); *H04L 63/1416* (2013.01); *H04L 63/20* (2013.01)

(58) Field of Classification Search
CPC . H04L 63/1425; H04L 63/1416; H04L 63/20; H04L 63/1441; G06F 16/9024
USPC .......................................................... 726/23
See application file for complete search history.

(56) References Cited

U.S. PATENT DOCUMENTS

| | | | | |
|---|---|---|---|---|
| 7,624,448 B2 * | 11/2009 | Coffman | ............... | G06F 21/552 726/22 |
| 8,719,943 B2 * | 5/2014 | Noel | .................. | H04L 63/1425 726/25 |
| 8,813,234 B1 * | 8/2014 | Bowers | .................. | H04L 63/20 726/25 |
| 9,578,042 B2 * | 2/2017 | Hu | ...................... | H04L 63/1408 |
| 9,609,011 B2 * | 3/2017 | Muddu | ................. | G06F 16/444 |

(Continued)

OTHER PUBLICATIONS

"Data Loss Prevention and Monitoring in the Cloud" by netSkope, Inc., Nov. 2014, 18 pgs.

(Continued)

*Primary Examiner* — Taghi T Arani
(74) *Attorney, Agent, or Firm* — Haynes Beffel & Wolfeld, LLP; Ernest J. Beffel, Jr.

(57) ABSTRACT

The technology disclosed includes a system to reduce clutter during graph presentation for security incident analysis. The system includes logic to score nodes potentially collapsed by equivalence, of indicated interest for security incident analysis, to prevent aggregation. The system includes logic to aggregate and hide equivalent nodes that have matching degrees, that are connected to matching nodes by matching edge types, and that have scores below a first selected threshold. The system does not collapse nodes that are interesting for security analysis and keeps them visible. The technology disclosed identifies chains of at least three nodes having degrees of 1 or 2, without branching from any node in the chain. The identified chains are collapsed into chain-collapsed single nodes. Two different cases of chains including whisker chains ending in a leaf node and chains connected at both ends to two other nodes are presented.

11 Claims, 12 Drawing Sheets

(56) References Cited

U.S. PATENT DOCUMENTS

| | | | | |
|---|---|---|---|---|
| 10,341,373 B2* | 7/2019 | Bhatkar | ............. | H04L 63/1425 |
| 10,409,995 B1* | 9/2019 | Wasiq | ................ | H04L 63/1433 |
| 10,831,827 B2* | 11/2020 | Gifford | ................ | G06Q 30/02 |
| 2014/0317736 A1* | 10/2014 | Cao | ........................ | H04L 67/22 |
| | | | | 726/23 |
| 2015/0188941 A1* | 7/2015 | Boshmaf | ............ | H04L 63/1441 |
| | | | | 726/22 |
| 2016/0205122 A1* | 7/2016 | Bassett | ................ | G06F 21/577 |
| | | | | 726/23 |
| 2017/0063910 A1* | 3/2017 | Muddu | ................ | G06F 16/285 |
| 2017/0199927 A1* | 7/2017 | Moore | ................... | H04W 4/02 |
| 2017/0222873 A1* | 8/2017 | Lee | .................... | H04L 41/0803 |
| 2018/0308026 A1* | 10/2018 | Sinha | ................... | G06F 16/288 |
| 2018/0351783 A1* | 12/2018 | Patrich | ............... | H04L 41/0636 |
| 2018/0367548 A1* | 12/2018 | Stokes, III | ............ | H04L 63/145 |

OTHER PUBLICATIONS

"Repave the Cloud-Data Breach Collision Course," netSkope, Inc., 2014, 6 pgs.

Kent et al, Guide to Computer Security Log Management, National Institute of Standards and Technologuy (NIST), Special Publication No. SP 800-92, Sep. 2006, 64 pages.

A. C. Gilbert et al. Compressing Network Graphs. InLinkKDD, 2004, 10 pgs.

"The Netskope Advantage: Three "Must-Have" Requirements for Cloud Access Security Brokers", Jul. 2015, WP-12-2, 4 pages.

"The Netskope Active Platform Enabling Safe Migration to the Cloud", Apr. 2015, DS-1-8, Netskope, Inc., 6 pages.

"Netskope the 15 Critical CASB Use Cases", Netskope, Inc., EB-141-1, 19 pages.

"Cloud Data Loss Prevention Reference Architecture", Sep. 2015, Netskope, WP-88-1, 2 pages.

\* cited by examiner

SYSTEMS AND METHODS TO SHOW DETAILED STRUCTURE IN A SECURITY EVENTS GRAPH

PRIORITY DATA

This application claims the benefit of U.S. Provisional Patent Application No. 62/683,789, entitled "SYSTEM TO SHOW DETAILED STRUCTURE IN A MODERATELY SIZED GRAPH", filed on Jun. 12, 2018. The provisional application is incorporated by reference as if fully set forth herein.

INCORPORATIONS

The following materials are incorporated by reference as if fully set forth herein:

U.S. Provisional Patent Application No. 62/683,795, entitled "ALERT PRIORITIZATION USING GRAPH ALGORITHMS", filed on Jun. 12, 2018;

Contemporaneously filed U.S. patent application Ser. No. 16/361,023 entitled "SYSTEMS AND METHODS FOR ALERT PRIORITIZATION USING SECURITY EVENTS GRAPH", filed on 21 Mar. 2019.

FIELD OF THE TECHNOLOGY DISCLOSED

The technology disclosed relates to graph presentation for security incident analysis.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Security analysts use log data generated by security and operations systems to identify and protect enterprise networks against cybersecurity threats. Gigabytes of log security and operations log data can be generated in a short time. These logs contain security events with varying levels of threat. Firstly, it is difficult for an analyst to go through these logs and identify the alerts that need immediate attention. Secondly, it is difficult to identify different computer network entities related to a particular alert. Graphs can be used to visualize computer network entities which are connected to other entities through edges. However for a typical enterprise network, graphs can become very large with hundreds of thousands of entities connected through tens of millions of edges. Security analysts are overwhelmed by such graphs of security events and they can miss most important alerts and entities related to those alerts.

Therefore, an opportunity arises to automatically identify and present to analysts the most important nodes in graphs representing computer network entities.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
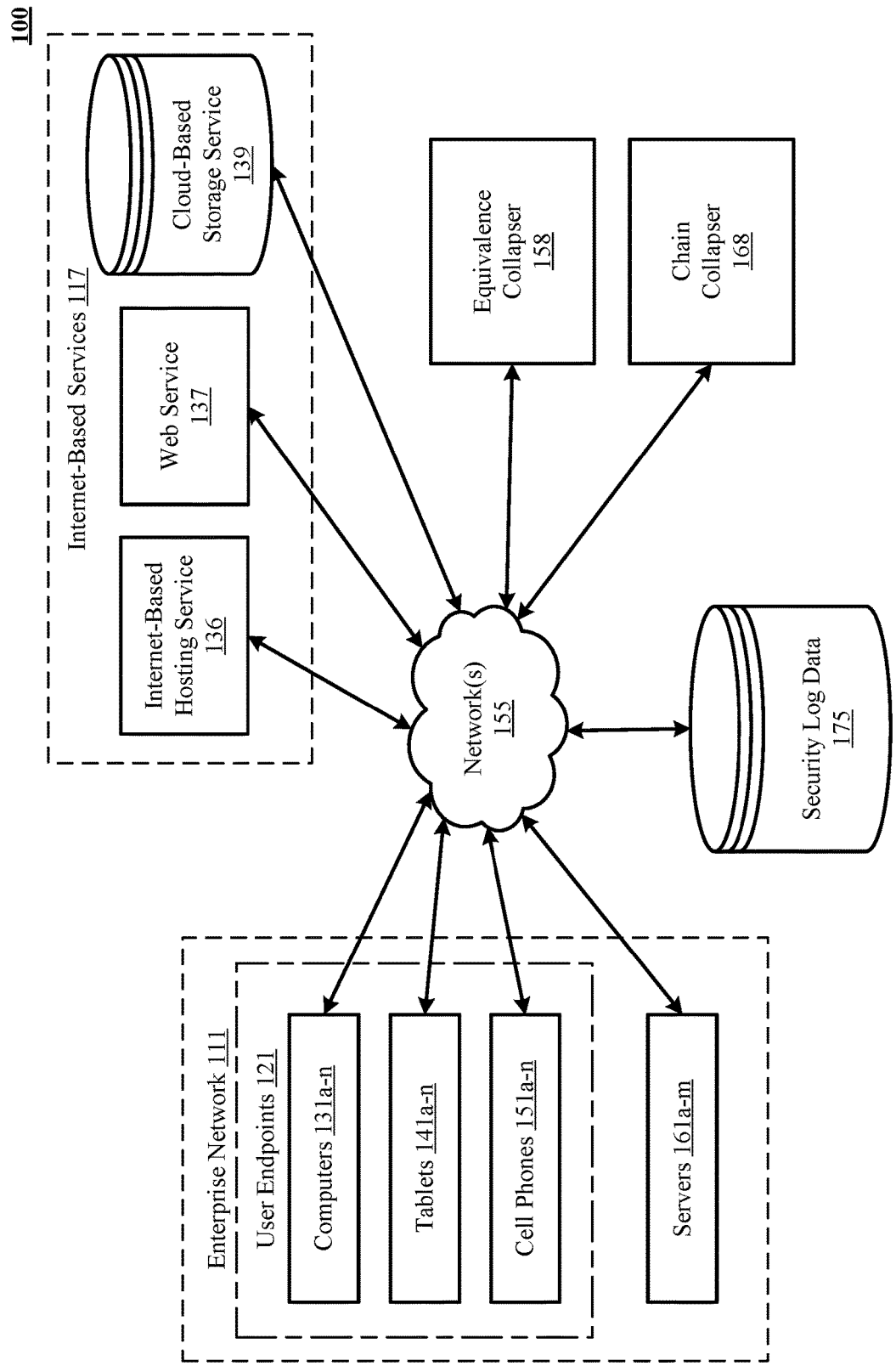
FIG. 1 illustrates an architectural level schematic of a system in which an equivalence collapser and a chain collapser are used to prevent aggregation of nodes of indicated interest in a security events graph.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

Protecting enterprise networks against cybersecurity attacks is a priority of every organization. Gigabytes of security log data can be generated by packet filters, firewalls, anti-malware software, intrusion detection and prevention systems, vulnerability management software, authentication servers, network quarantine servers, application servers, database servers and other devices, even in a single 24 hour period. More generally, log records are generated by both security systems and operation systems. The operational systems, such as servers, caches and load balancers, report audit logs that detail all activity of the systems. Log information is presented to security analysts for a variety of purposes, including investigating security incidents and identifying potential threats.

Graphs are one way to help analysts visualize the computer network entities, both for incident response and threat hunting. Logs for an enterprise network can identify hundreds of thousands of nodes connected through tens of millions of edges, referred to as a graph. Graphs become more complex over larger windows, such as a week or month of security events. Presenting a detailed graph with the month of security events is overwhelming or meaningless to a security analyst. It is overwhelming if the analyst tries to make sense of individual edges. It is meaningless when the graphic visualization looks like a ball of string.

The technology disclosed includes two collapsing methods, equivalence collapsing and chain collapsing, which can be used to simplify graph structures without hiding nodes of high interest to analysts. In equivalence collapsing, a group of nodes can be collapsed into a single representative node, a so-called equivalence node, when nodes in the group are equivalent, in the sense that the nodes have matching degrees, are connected to the same endpoint nodes, and are connected by matching edge types. To avoid hiding nodes of high interest, equivalent nodes are scored before the collapse. Nodes that score above a predetermined threshold are excluded from collapsing.

In chain collapsing, a chain of nodes can be collapsed into a single representative node, a so-called chain-collapsed node, when nodes in the chain have a degree of one or two. Chain collapsing is only applied to simple chains, not chains with branches. Slightly different cases are presented by a chain of nodes that forms a whisker ending in a leaf node (degree of one at the end) and by a chain of nodes connected at both ends to two other nodes (degree of two for all nodes). Before collapsing, nodes in the chain are scored. Chains that score above a predetermined threshold are excluded from collapsing. After collapsing, the representative chain-collapsed node is given a score that combines scores of the collapsed nodes.

Chain-collapsed nodes can be further equivalence collapsed. When equivalence collapsing follows chain collapsing, an additional factor is taken into account: whether chain-collapsed nodes being judged for equivalence represent chains of matching length.

System Overview

We describe a system to simplify graph structures without hiding nodes of high interest to analysis. The system is described with reference to FIG. 1 showing an architectural level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes system 100. This paragraph names the labelled parts of system 100. The figure illustrates user endpoints 121, servers 161a-m, a network(s) 155, an Internet-based hosting service 136, a web service 137, a cloud-based storage service 139, an equivalence collapser 158, a chain collapser 168, and a security log database 175. Internet-based hosting service 136, the web service 137, and the cloud-based storage service 139 are collectively referred to as Internet-based services 117. User endpoints 121 and servers 161a-m are part of an enterprise network 111.

Servers 161a-m and user endpoints 121 such as computers 131a-n, tablets 141a-n, and cell phones 151a-n access and interact with the Internet-based services 117. In one implementation, this access and interaction is modulated by an inline proxy (not shown in FIG. 1) that is interposed between the user endpoints 121 and the Internet-based services 117. The inline proxy monitors network traffic between user endpoints 121 and the Internet-based services 117 and can include detection of malicious activity to protect enterprise network and data. The inline proxy can be an Internet-based proxy or a proxy appliance located on premise. The log data collected by the inline proxy can be stored in the security log database 175.

In a so-called managed device implementation, user endpoints 121 are configured with routing agents (not shown) which ensure that requests for the Internet-based services 117 originating from the user endpoints 121 and response to the requests are routed through the inline proxy for policy enforcement. Once the user endpoints 121 are configured with the routing agents, they are under the ambit or purview of the inline proxy, regardless of their location (on premise or off premise).

In a so-called unmanaged device implementation, certain user endpoints that are not configured with the routing agents can still be under the purview of the inline proxy when they are operating in an on premise network monitored by the inline proxy. Both managed and unmanaged devices can be configured with security software to detect malicious activity and store logs of security events in the security log database 175.

The enterprise users access Internet-based services 117 to perform a wide variety of potentially logged operations such as search for information on webpages hosted by the Internet-based hosting service 136, send and receive emails; upload documents to cloud-based storage service 139 or download documents stored on the cloud-based storage service 139. The security log database accumulates logs of events occurring within the organization's systems and networks from multiple sources. Two sources of such log data include security systems and operations systems. Security systems include packet filters, firewalls, anti-malware software, intrusion detection and prevention systems, vulnerability management software, authentication servers, network quarantine servers. Operations systems include servers, workstations, caches and load balancers and networking devices (e.g., routers and switches). These systems can report hundreds of events in an enterprise network in one day. Security analyst analyzes these logs to identify threats to the enterprise network 111. Security analyst is overwhelmed when presented hundreds of events to analyze. The technology disclosed can be used in other contexts and can include collection of data from a variety of data sources, beyond the example operations performed by users visiting the Internet-based services 117. Of course, other contexts, in addition to security monitoring, can make use of the technology disclosed, such as network operations and social networks, and, more generally, any network represented by large graph of nodes connected by relationships that can be analyzed to identify collapsible groups of nodes.

Not all security events present the same level of anomalous behavior in the enterprise network. Consider a first example of a log entry in the security log database 175 reporting a failed authentication from a user endpoint, which is common with long passphrases and frequently changed passwords. A second example of a log entry is also an authentication failure but represents a high risk to the organization. In the second example, an attacker gained access to a user endpoint 121 in the enterprise network 111 and obtained a list of servers 161a-m in the enterprise network. The attacker attempted to authenticate to the servers. This resulted in a spike in the number of failed authentications originating from the compromised user endpoint.

The attacker can also move laterally to other user endpoints in the enterprise network. The second example requires accelerated investigation by a security analyst. The investigation in such situations is sometimes referred to as threat hunting, as it requires the security analyst to proactively and iteratively search through the enterprise network to detect and isolate threats that evade existing security solutions. A real time response from the security analyst can limit the loss to the organization. This is somewhat different than another type of analysis referred to as incident response. Consider for example, a file containing malware is downloaded to a server in the enterprise network. The malware can start several processes on the server. The security analyst will perform incident response analysis to determine the computer network entities that are impacted by the malware. Such security events also need to be prioritized to get security analyst's attention as they can potentially impact a large number of computer network entities.

Graphs are one way to help analysts visualize the computer network entities, both for threat hunting and incident response types of analysis. Logs for an enterprise network can identify hundreds of nodes connected through thousands of edges, referred to as a graph. Graphs become more complex over larger windows, such as a week or month of security events. Presenting a detailed graph with the month of security events is also overwhelming or meaningless to a security analyst.

The technology disclosed simplifies graph structures for the security analyst by providing two node collapsing techniques performed by the equivalence collapser 158 and the chain collapser 168. Nodes that are of high interest to security analyst are not hidden in the graph while the nodes that represent other computer network entities can be collapsed into a single representative node. Application of equivalence and chain collapsing to security events graphs simplifies complex graphs so that the security analyst can focus on nodes that are of interest for high risk security events. The two node collapsing techniques apply to two different types of graph structures. Nodes in the graph can represent a variety of network resources in a computer network. Network resources can include data, hardware devices, or services that can be accessed from a remote computer in an enterprise network. Examples of nodes include servers, clients, services, applications, service principals, load balancers, routers, switches, storage buckets, databases, hub, IP addresses, etc. There can be tens to hundreds of different types of nodes in a computer network graph. Some examples of services built on open source frameworks and represented as nodes include Zookeeper™, Kafka™, Elasticsearch™, etc. In other contexts, graphs can represent people, departments, organizations, etc.

Equivalence collapsing applies to a first type of graph structure consisting of multiple nodes connected to the same node with the same type of edge and simplifies such graphs by collapsing the multiple nodes to a single representative node. In the simplified graph, the multiple collapsed nodes are represented by a single representative node, a so-called equivalence node. This scenario occurs frequently in graphs representing computer network entities. For example, consider multiple user endpoints connected to a server, or multiple processes started by a user via a user endpoint. In these examples, the nodes representing multiple user endpoints or multiple processes can be respectively collapsed to an "equivalence node". The nodes collapsed into an equivalence node are equivalent in the sense that the nodes have matching degrees, are connected to the same node (such as the server or the user endpoint in two examples above), and are connected by matching edge types. In the examples above, all endpoints have the same type of connection to the server and all processes have the same type of connection to the user. Entities in a computer network can be connected to each other through different types of connections such as association, action, or communication. For example, an IP address entity is associated with a user endpoint entity or a user endpoint entity performs an action, such as authentication, with a server entity. Equivalence nodes simplify the graph for visualization purposes by collapsing nodes presenting similar information, including connections to other entities.

The technology disclosed avoids hiding nodes of high interest by scoring nodes before applying equivalence collapsing. Nodes that score above a predetermined threshold are excluded from collapsing. In the example of multiple user endpoints connected to a server, if one user endpoint has been compromised by an attacker, its score is increased. This will keep the compromised node visible after the application of equivalence collapsing while the remaining equivalent nodes in the group will be collapsed and represented by an equivalence node. Therefore, the technology disclosed enables avoidance of hiding nodes of high interest.

The second method for simplifying graphs is chain collapsing which applies to a second type of graph structure consisting of multiple nodes connected in a chain having a degree of one or two. Chain collapsing simplifies such graphs by collapsing multiple nodes to a single representative node. In the simplified graph, the multiple collapsed nodes are represented by a single representative node, a so-called chain-collapsed node. These types of graph structures also appear frequently in graphs of computer network entities. For example, a file that is renamed many times will appear as a chain of nodes connected to each other in which each node indicates a new file name. Another example which will form a chain of nodes in a graph of computer network entities is that of a process connected to its long-path filename which is further connected to pathless filename. Equivalence collapsing technique does not simplify the chains of nodes in the graph as the nodes connected in the chain do not fulfill the conditions of equivalence nodes. Chain collapsing is only applied to simple chains which consist of nodes having degrees one or two and not chains with branches.

Chain-collapsing can be applied to two slightly different cases of chains. A first case is that of a chain of nodes that forms a whisker by ending in a leaf node. In this type of chain all nodes have a degree of two except one node at the end of the chain which has a degree of one. A second case is that of a chain of nodes that is connected at both ends to two other nodes. In this type of chain, all nodes have a degree of two. The technology disclosed can also collapse chains that are variation of the second case in which the starting and the ending nodes are the same. This type of chain is in the form of a loop, with all nodes in the chain having a degree of two and the starting/ending node have a degree greater than two.

Scores are assigned to nodes in the chains before collapsing the chains. In one implementation, all nodes in chains are assigned equal score. Scores for chains are calculated by summing the scores of the nodes in respective chains. Chains that have scores above a threshold are not collapsed. This is to avoid collapsing chains of unusual length so that these are visible to the security analyst. The technology disclosed can apply other criteria to score nodes in a chain. For example, if one or more nodes in a chain have an alert associated with them, their scores are increased above the threshold so that this chain of nodes is not collapsed. This causes nodes of high interest to remain visible to the security analyst. After the chains are collapsed, each chain is represented by a single chain-collapsed node.

Chain-collapsed nodes can be further equivalence collapsed, if the chain-collapsed nodes fulfill an additional factor: whether chain-collapsed nodes that are being considered for equivalence collapsing have matching length represented by their respective scores. Applying the two collapsing techniques sequentially considerably reduces the complexity of the graph representing computer network entities.

Completing the description of FIG. 1, the components of the system 100, described above, are all coupled in communication the network(s) 155. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, SecureID, digital certificates and more, can be used to secure the communications.

System Components—Equivalence Collapser

Figure 2:
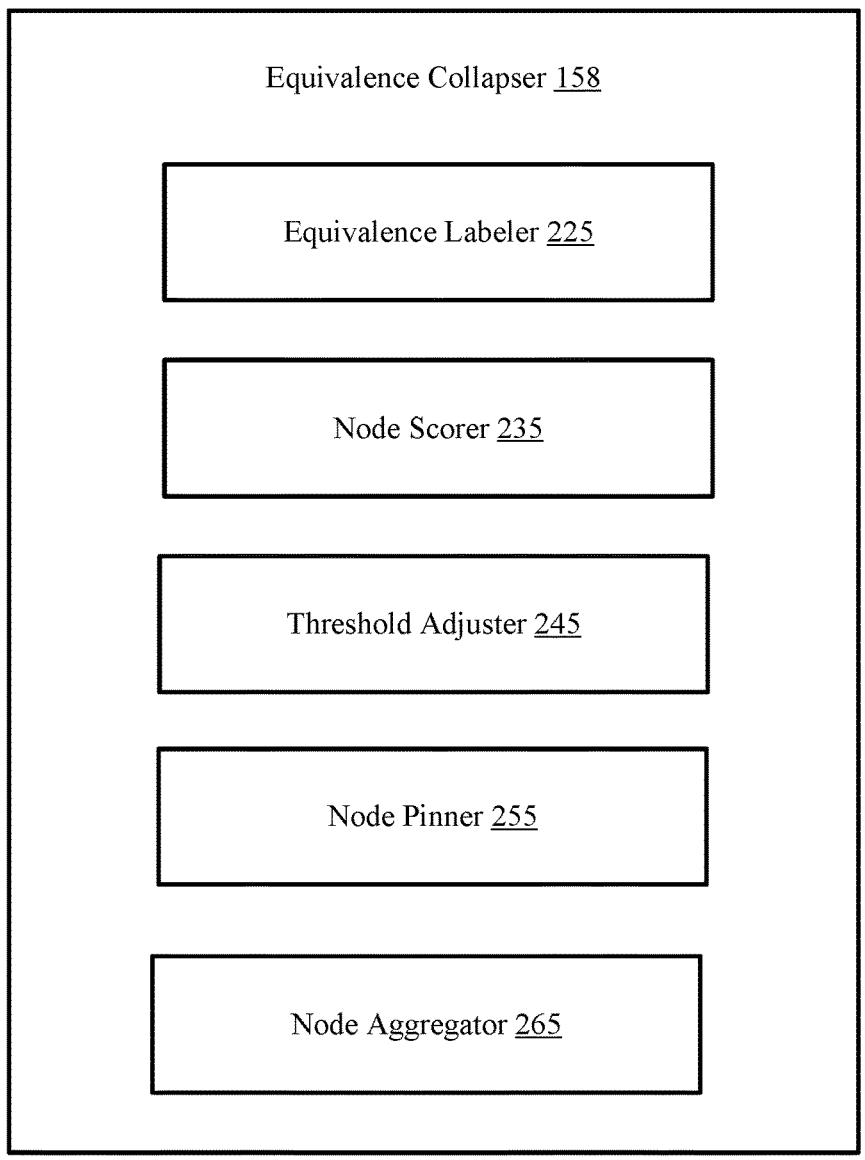
FIG. 2 is a block diagram of example components of the equivalence collapser of FIG. 1.

FIG. 2 is a high-level block diagram 200 illustrating subsystem components of the equivalence collapser 158. The subsystems include an equivalence labeler 225, a node scorer 235, a threshold adjuster 245, a node pinner 255, and a node aggregator 265. These subsystems are computer implemented using a variety of different computer systems as presented below in description of FIG. 8. The illustrated subsystem components can be merged or further separated, when implemented. The features of the subsystems are described in the following paragraphs.

The first step to perform equivalence labelling, according to a method disclosed, is to assign degree labels to nodes in the graph, which aid in determining equivalent nodes. A group of nodes with a same label belong to the same equivalence class and can be collapsed to a single equivalence node. Equivalence labeler 225 assigns these labels to nodes. In one implementation, the equivalence labeler assigns labels to nodes in an increasing order of degree of connectedness of the nodes. For example, all nodes with degree 1 in the graph are assigned labels before the nodes with degree 2 and so on. In such an implementation, the process to assign labels starts with the nodes having a degree of 1 in the graph. The equivalence labeler 225 assigns labels to nodes with degree 1 such that nodes with matching labels are in the same group of equivalent nodes. The equivalence labeler 225 considers the degree of the node, its neighboring node and connection type of the node when assigning labels. Nodes having the same degree, connected to the same neighbor node with the same connection type are given the same label. The label assignment process continues until all equivalent nodes in the graph have been assigned labels.

Efficiency can be improved by limiting application of labels to nodes, based on rules of thumb regarding nodes that are unlikely to be collapsible. In one implementation, the equivalence labeler 225 assigns labels to nodes up to a degree 4 connectedness and not for degrees five and greater. In another implementation, labels are assigned up to a degree 3 connectedness, for equivalence collapsing. In most graphs, nodes with higher degrees of connectedness are less likely to be collapsible. Therefore, limiting the labelling of nodes up to a degree 4 reduces the computational resources required for this labelling process and also reduces time required to complete the labelling process.

Nodes with same labels can be collapsed into an equivalence node. However, the technology disclosed identifies nodes of high interest to analyst before collapsing equivalent nodes so that nodes of high interest remain visible to the analyst, are not included in a collapse. The node scorer 235 assigns scores to the nodes. In one implementation, the scores are assigned according to a severity level of the alert generated for the computer network entity. In one implementation, alerts are generated by the security systems, such as firewalls and antivirus, along with a score. The network-based security systems can assign scores to security events or entities related to a security event. Host-based security systems deployed on user endpoints or other computing devices can also score security events. In one implementation, the initial alert scores assigned to network entities by one or more security systems are used to determine a node score by combining it with other factors. An example of such factors is the number of neighboring nodes with edge connections. If there are fewer nodes in the neighborhood of the node being scored, then a high score can be assigned to the node so that the node is not collapsed into an equivalent node. This represents a scenario in which the node being scored is located in a part of the graph which is already sparse. In one implementation, the scores assigned by the security systems are related to a connection between two entities in the computer network. For example, consider an "action" type connection between a user endpoint and a server when user endpoint is attempting to authenticate to a host. Now consider this user endpoint is comprised as an attacker has gained access to it and the attacker is attempting to authenticate to the server without valid credentials. This results in a spike in authentication action from the compromised user endpoint which is observed by the security system. The connection between the user endpoint and the host is then labeled as an alert. The node (representing user endpoint) is connected to an edge (representing authentication action) that is labeled as an alert and therefore, the node is given a high score.

The technology disclosed avoids hiding nodes of high interest in the graph by comparing the scores of the nodes with a threshold. The threshold adjuster 245 sets a value of the threshold which is compared with node scores to exclude hiding nodes of high interest. The nodes having scores above the threshold are not collapsed into equivalence nodes. The technology disclosed can aggregate the nodes less aggressively by setting a low value of the threshold. This results in a higher number of nodes avoiding collapsing into equivalence nodes. Thus displaying more detail to the analyst in the graph. On the other hand, the technology disclosed can also aggregate more aggressively by setting a high value of the threshold. This results in collapsing of more nodes that have scores lower than the set threshold and results in displaying less detail in the graph because only nodes with high scores that are above the set threshold avoid collapsing into equivalence nodes.

The node pinner 255 marks a node as "do not collapse". The nodes that are pinned are not collapsed in equivalence collapsing. Nodes that are important for a particular analysis carried out by the security analyst can be pinned. The node aggregator 265 traverses through the graph and aggregates nodes with matching labels that belong to the same equivalence group provided their score is below the threshold set by the threshold adjuster. The nodes in each group are then replaced with corresponding equivalence nodes.

System Components—Chain Collapser

Figure 3:
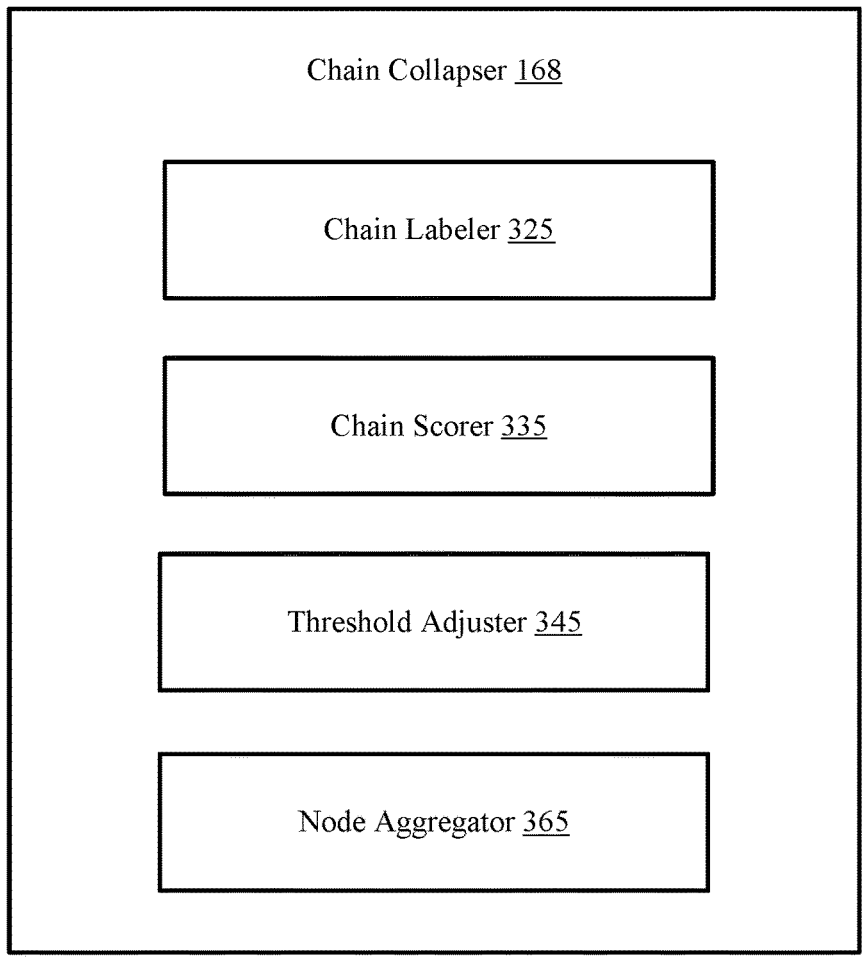
FIG. 3 is a block diagram of example components of the chain collapser of FIG. 1.

FIG. 3 is a high-level block diagram 300 illustrating subsystem components of the chain collapser 168. The subsystems include a chain labeler 325, a chain scorer 335, a threshold adjuster 345, and a node aggregator 365. These subsystems are computer implemented using a variety of different computer systems as presented below in description of FIG. 8. The illustrated subsystem components can be merged or further separated, when implemented. The features of the subsystems are described in the following paragraphs.

The chain collapser 168 implements the second of the two collapsing methods proposed by the technology disclosed. Chain collapsing focuses on collapsing graph structures that are in the form of chains of nodes. Equivalence collapsing does not simplify chains of nodes as all nodes in the chain are not connected to a matching node. The chain labeler 325 assigns labels to nodes such that all nodes in a chain have the same label. Chain collapsing is applied to simple chains and chains with branches are not considered. The technology disclosed applies chain collapsing to two slightly different cases of chain structures. The first type of chain structure, also referred to as a whisker chain, ends in a leaf node of degree one. The second type of chain is connected at both ends to two other nodes which means that all nodes in the chain have a degree 2. The technology disclosed can also collapse chains that are variation of the second case in which the starting and the ending nodes are the same. This type of chain is in the form of a loop, with all nodes in the chain having a degree of two and the starting/ending node have a degree greater than two.

The chain labeler 325 traverses the graph and labels nodes in a chain. In one implementation, to label nodes connected in a chain structure, the chain labeler finds a node of degree 2 with a first adjacent node of degree 2 and a second adjacent node with degree not equal to 2. The second adjacent node is the end node of the chain structure. If the chain is in the form of a whisker, the second adjacent node has a degree 1 otherwise, the second adjacent node has a degree equal to or greater than 3. The chain labeler then traverses the nodes in the chain and assigns labels to the nodes, until it reaches a node with a degree equal to or greater than 3 which is the other end of the chain. The chain scorer 335 scores the chains. In one implementation, the scores are calculated using the number of nodes in the chains.

The threshold adjuster sets a value of a threshold with which scores of chains are compared before collapsing the chains into single representative chain-collapsed nodes. The node aggregator 365 collapses nodes in chains to chain-collapsed nodes if the score of the chain is less than the threshold. This allows chains of unusual length excluded from collapsing and being visible to the security analyst. In the following paragraphs, examples of simplification of graph structures using equivalence and chain collapsing, without hiding nodes of high interest, are presented.

Example of Equivalence Collapsing

Figure 4:
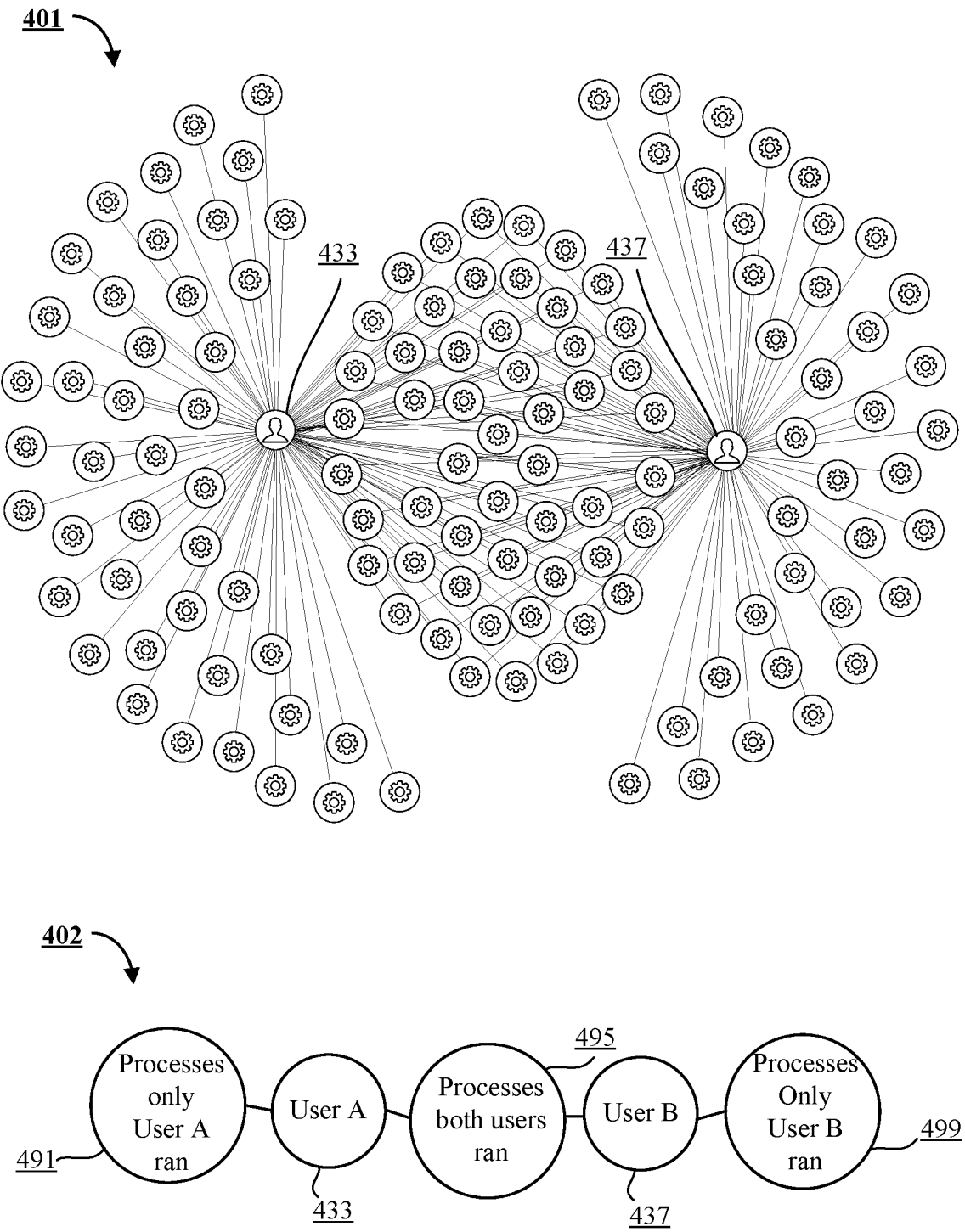
FIG. 4 is an example of reducing clutter during graph presentation by applying equivalence collapsing to a graph representing users connected to processes in a computer network.

FIG. 4 presents an example in which two types of entities are represented in a graph of a computer network. This is a simple example in which two users A and B start many processes. The nodes on left side in a graph 401 represent processes that are started by user A 433 while nodes on the right side of graph 401 represent processes started by user B 437. The nodes in the middle of graph 401 represent processes that are shared by both users A and B. Equivalence collapsing method to simplify the structure of graph 401 results in a graph 402. The nodes on the left of graph 401 are equivalent and are collapsed to an equivalence node 491 and which is connected to the node 433 representing user A in the graph 401. Similarly, nodes on the right side of the graph 401 are collapsed to an equivalence node 499 which is then connected to the node 437 representing user B in the graph 402. The nodes in the middle of the graph are collapsed to an equivalence node 495 which is connected to both of the nodes 433 and 437 representing the user A and the user B respectively. It can be seen from this simple example that the graph 401 which is overwhelming to an analyst is simplified after application of equivalence collapsing. The illustration of equivalence collapsing in FIG. 4, however, does not include scoring of nodes so that nodes of high interest are not collapsed. The illustrations in FIGS. 5A, 5B, and 5C present a series of examples in which node scores are compared with a threshold to determine nodes of high interest that are not collapsed in equivalence nodes.

Figure 5A:
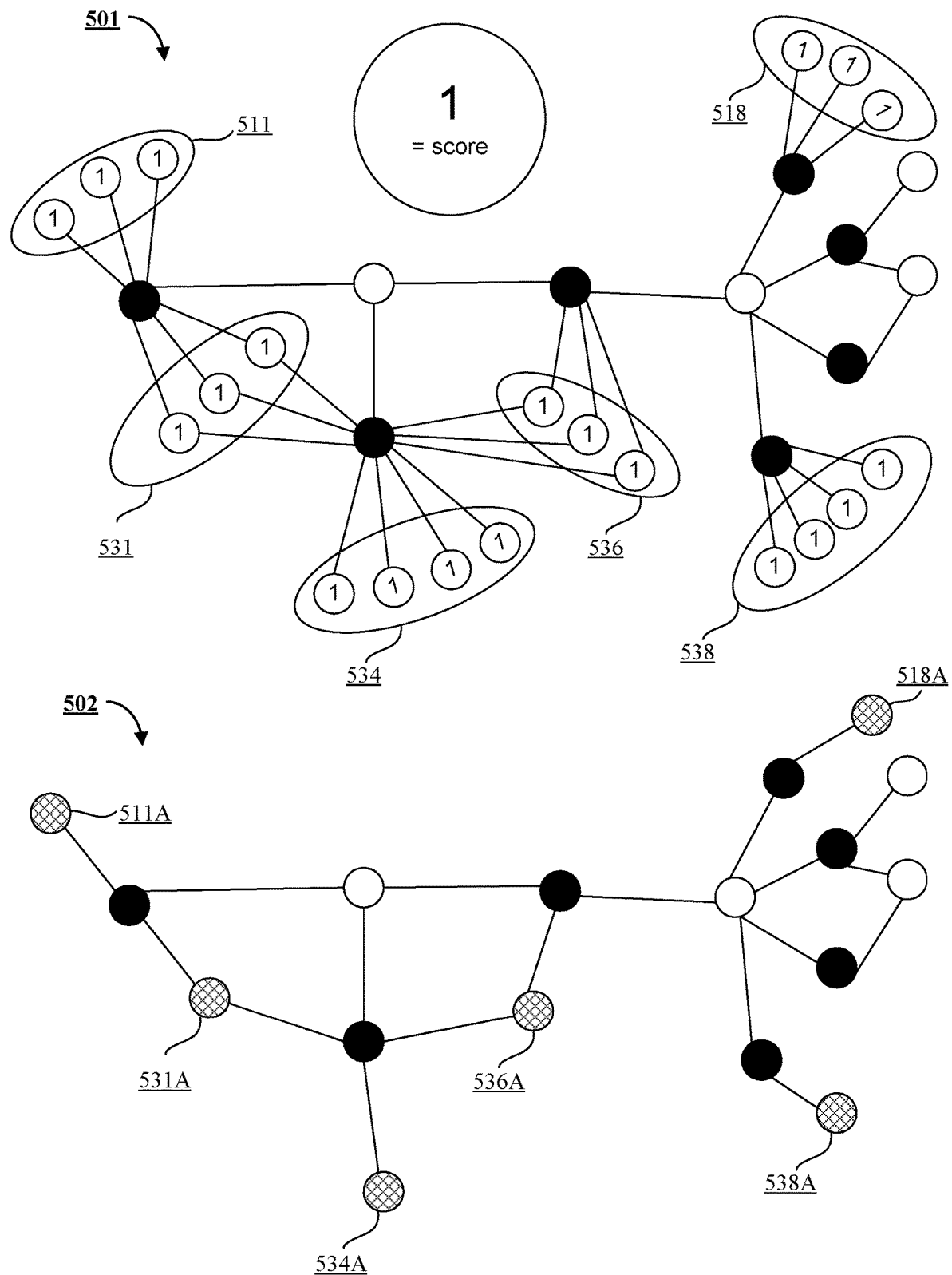
FIG. 5A illustrates equivalence collapsing by aggregating nodes in a graph by using scores assigned to the nodes.

FIG. 5A presents a graph 501 representing entities in a computer network. The equivalent nodes are labeled in groups 511, 518, 531, 534, 536, and 538. Nodes in each of the labeled groups fulfills the conditions of equivalence labeling method, i.e., all of the nodes in a same equivalent group have the same degree of connectedness, they are connected to matching nodes through matching edges. The nodes can represent different entities in a computer network such as user endpoints, servers, processes, etc. In one implementation, nodes in the graph can be shaded to represent different types of entities. For example, in the graph two types of entities in the computer network are represented by solid black and white colored nodes. A number written inside a node in an equivalence group represents the node's score. Scores are assigned to the nodes representing a threat level associated with the node as described above. In the graph 501, all nodes in equivalence groups have the same score of 1. Now consider the threshold for collapsing nodes in equivalence groups is set at a value of 2. After equivalence collapsing is applied, a graph 502, illustrates groups of equivalent nodes 511, 518, 531, 534, 536, and 538 replaced with single representative equivalence nodes 511A, 518A, 531A, 534A, 536A, and 538A, respectively. The equivalence nodes are shown in the graphs with a hatch pattern to distinguish from other nodes.

Figure 5B:
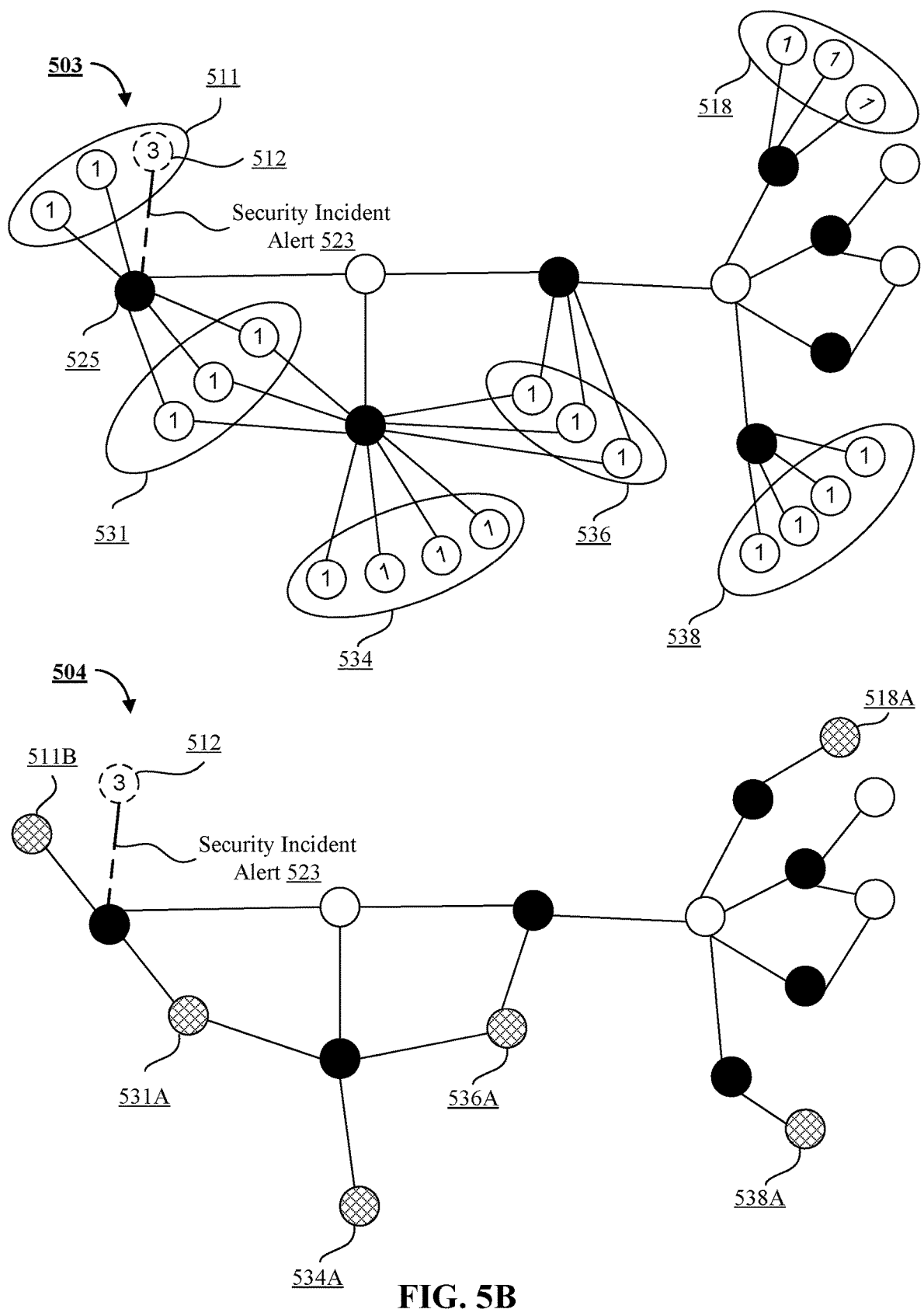
FIG. 5B illustrates preventing aggregation of a node in equivalence collapsing when the score of the node is increased due to a connected edge representing a security incident alert.

FIG. 5B presents a second example using a graph of computer network entities which has similar structure to the graph 501. However, in this example, a node 512 has a higher score of 3 than other nodes in the same group 511 of equivalent nodes. The reason for high score of node 512 is a security alert incident associated with the node and represented by a label of edge 523 that connects the node 512 to node 525. This alert can be received from the logs of one of the security systems deployed to protect the enterprise network and can represent an anomaly detected by the security system. For example, if node 512 represents a user endpoint and node 525 represents a server, the alert label for edge 523 can be generated because of unusual number of authentication failures. This can potentially require a "threat hunting" analysis to determine if an attacker has gained access to the user endpoint. Therefore, this node requires attention of the security analyst. The edge with alert label is shown with a broken line pattern to differentiate it from other edges. Now consider the threshold is set at a value of 2 as before. A graph 504 shows equivalence collapsed nodes for respective groups of equivalent nodes in the graph 503. As the score of node 512 is greater than the threshold value, it is not collapsed to an equivalent node 511B along with other nodes in the same group 511.

Figure 5C:
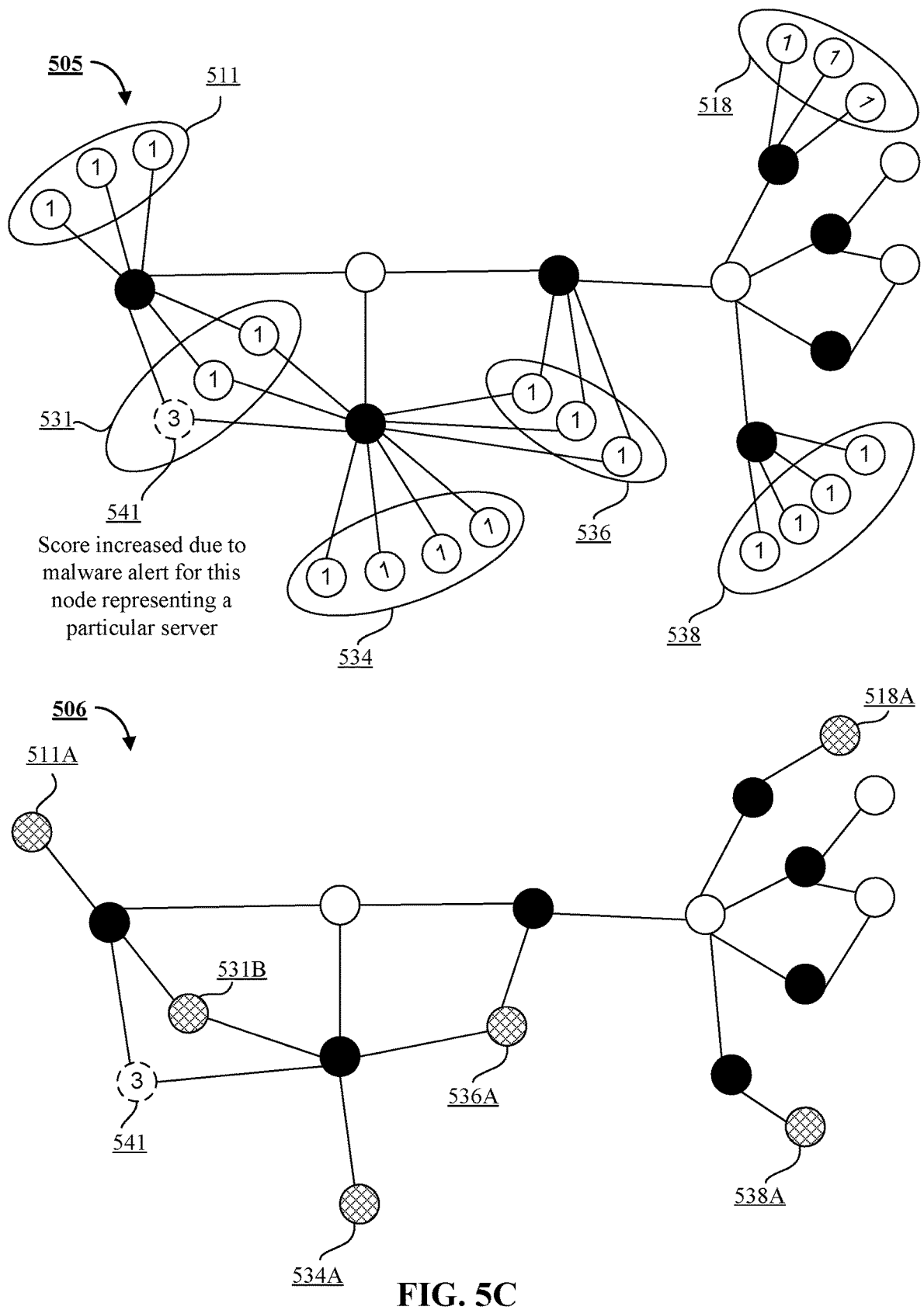
FIG. 5C illustrates preventing aggregation of a node in equivalence collapsing when the score of the node is increased due to security incident alert associated with the node.

FIG. 5C illustrates another scenario in which the score of a node in an equivalence group is increased. This is an example in which the security analyst performs incident response type of analysis. Note that in this scenario, the alert is not generated because of anomalous communication between two entities as illustrated in FIG. 5B. A node 541 in a graph 505 is scored higher than other nodes in the group 531 of equivalent nodes because of a malware detected in the entity represented by the node 541. The node 541 can represent a user endpoint on which a user has downloaded a file that contained a malware. As shown in a graph 506, the node 541 is not collapsed in an equivalence collapsed node 531B in which the other equivalent nodes belonging to the group 531 are collapsed. This is because the score of node 541 is above the threshold value of 2.

Example of Chain Collapsing

The second type of collapsing method proposed by the technology disclosed applies to nodes connected in a chain. The application of this method is presented in FIGS. 6A and 6B. A graph 601 illustrates a graph consisting of three chains of nodes 611, 613, and 615. This is an example of a user that executes three processes, each connected to a file which is again connected to a second file. The user is represented by a node 681 in the graph 601. The equivalence collapsing method presented above will not simplify the structure of this graph. The technology disclosed proposes a second collapsing method referred to as chain collapsing in which chains of nodes 611, 613, and 615 can be collapsed into a single representative chain-collapsed node. The graph 601 presents a first case of chain collapsing in which whisker chains are collapsed. The whisker chains end in leaf nodes. All nodes in whisker chains have a degree of two except the leaf nodes which have a degree of 1.

The chains are scored before they are collapsed using chain collapsing method. This is to identify unusually long chains that may represent an anomaly and therefore need to be excluded from collapsing. In one implementation, the chains are scores based on the number of nodes connected in the chain. The three whisker chains 611, 613, and 615 all have three nodes each and therefore, each has a score of 3. The scores are compared with a threshold to determine if the chain is excluded from collapsing. Consider the threshold is set at 10, which results in the three whisker chains 611, 613, and 615 collapsed to respective chain-collapsed nodes 611A, 613A, and 615A shown in a graph 602. The chain-collapsed nodes are shown with a hatch pattern to differentiate with other nodes in the graph. The scores for chain-collapsed node are presented besides respective chain-collapsed nodes. In this example, each of the three chains has a score of 3. Chain collapsing simplifies the structure of the graph 601 to the graph 602.

Figure 6A:
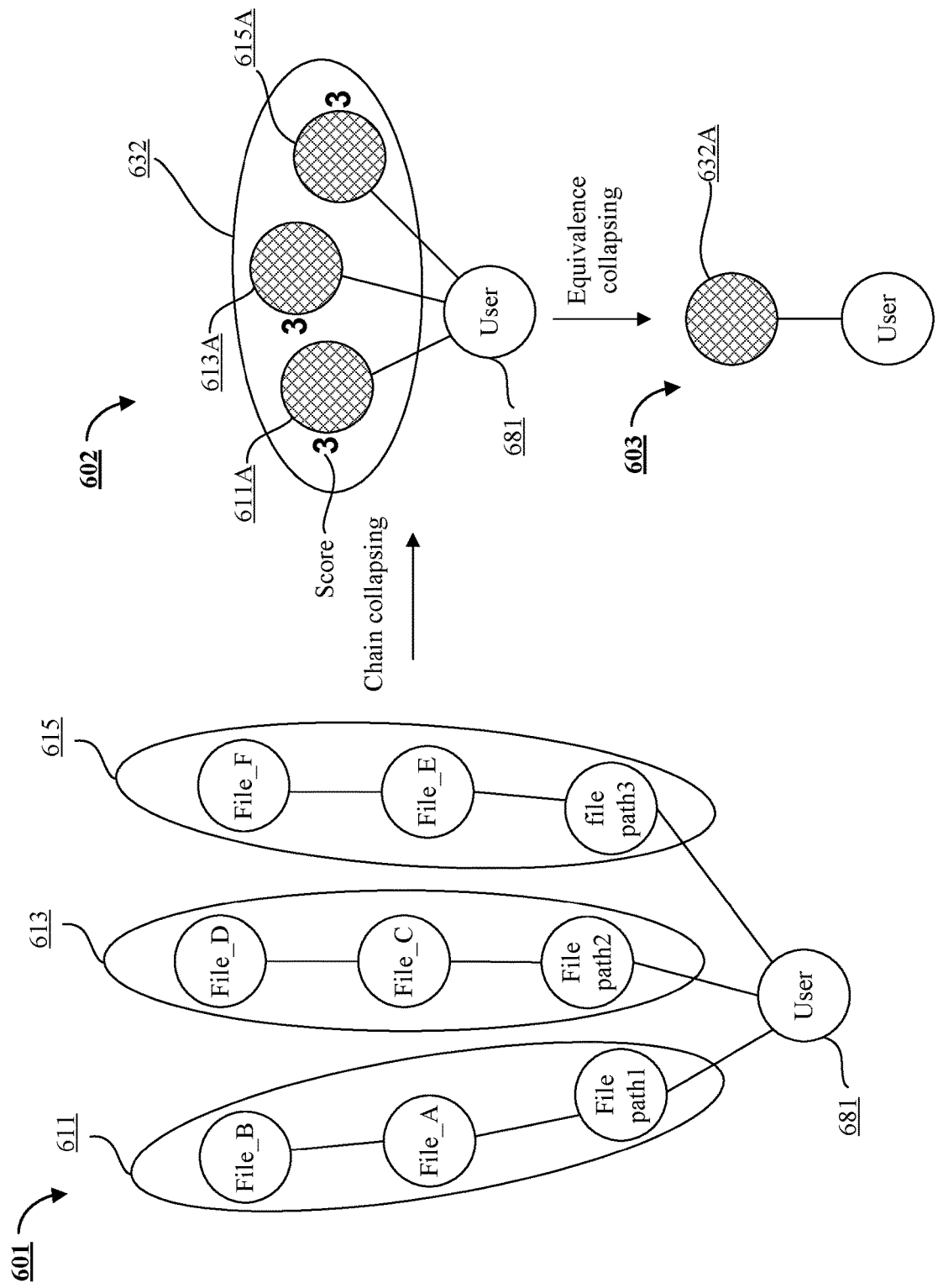
FIG. 6A is an illustration of chain collapsing of whisker chains followed by equivalence collapsing.

Chain-collapsed nodes can be further equivalence collapsed as shown in FIG. 6A. The chain-collapsed nodes 611A, 613A, and 615A have matching degrees, are connected to the same user node 681 and are connected by the same type of edges. Therefore, they fulfill the requirements of equivalence collapsing. However, the technology disclosed considers another factor for equivalence collapsing of chain-collapsed nodes, which is the length of the chains collapsed into the chain-collapsed nodes. Since all chain-collapsed nodes in equivalence group 632 have a score of 3 as shown besides each chain-collapsed node, the technology disclosed collapses the three chain-collapsed nodes into a single equivalence node 632A as shown in a graph 603.

Figure 6B:
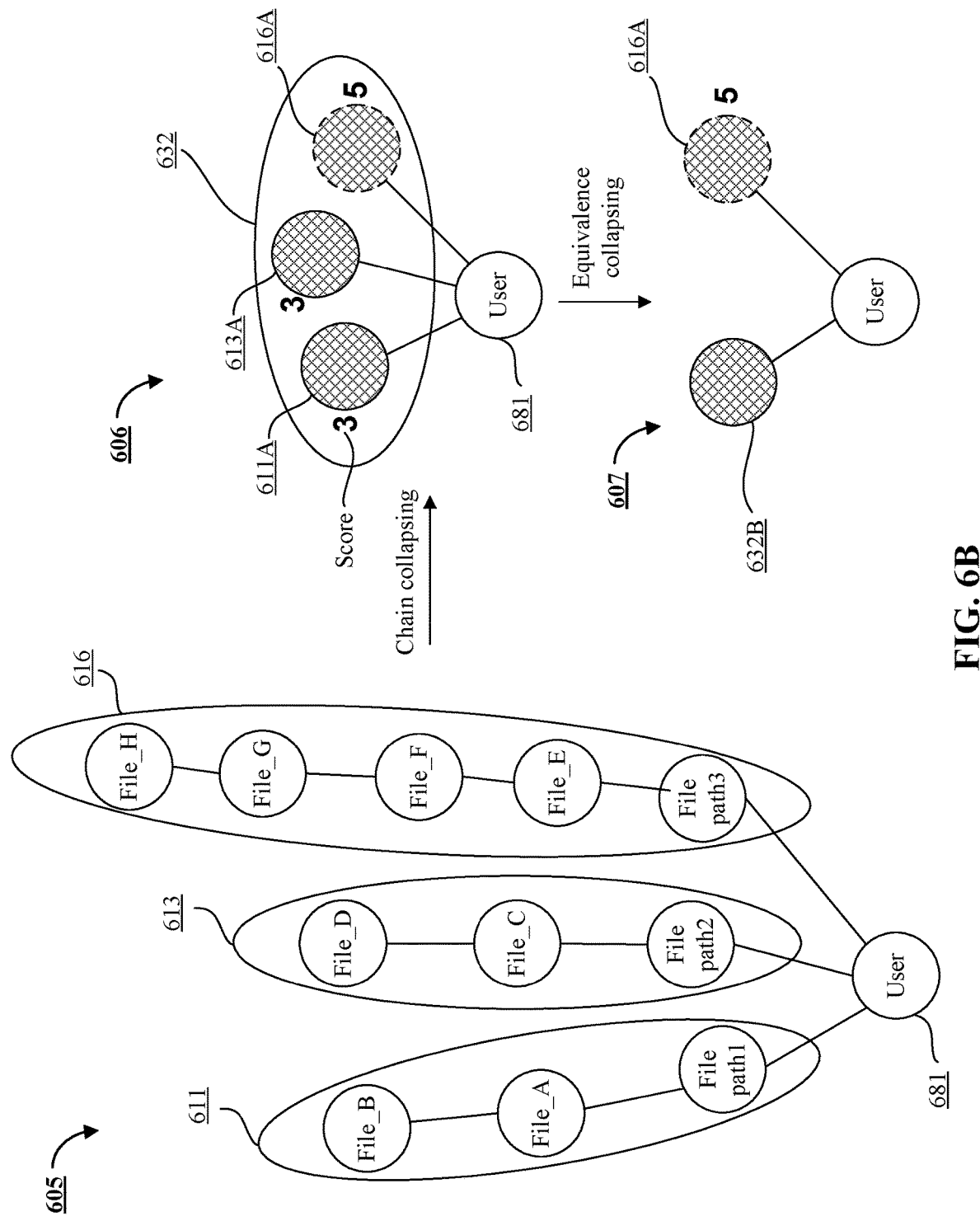
FIG. 6B illustrates chain collapsing of whisker chains and using scores of chain-collapsed single nodes to prevent aggregation of a node.

FIG. 6B presents a scenario in which chain collapsing is applied to whisker chains connected to a same node but having chains of different length. Three chains 611, 613 and 616, illustrated in a graph 605, are connected to the user node 681. The chains 611 and 613 each have a length 3. The chain 616 has five nodes connected in the chain and therefore its length is 5. Chain collapsing method is applied to the three chains and results in three chain-collapsed nodes 611A, 613B, and 616A as shown in a graph 606. The chain-collapsed nodes 611A and 613A each have a score of 3. The chain-collapsed node 616A has a score of 5 as shown in the graph 606. To differentiate the chain-collapsed node 616A from other chain-collapsed nodes in equivalence group 632 in the graph 606, the node 616A is drawn with a broken line. The chain collapsing is followed by equivalence collapsing. As the score of the chain-collapsed node 616A is different than the score of chain-collapsed nodes 611A and 613A, the chain-collapsed node 616A is not collapsed to equivalence node 632B in a graph 607 and remains visible as node 616A.

Figure 7A:
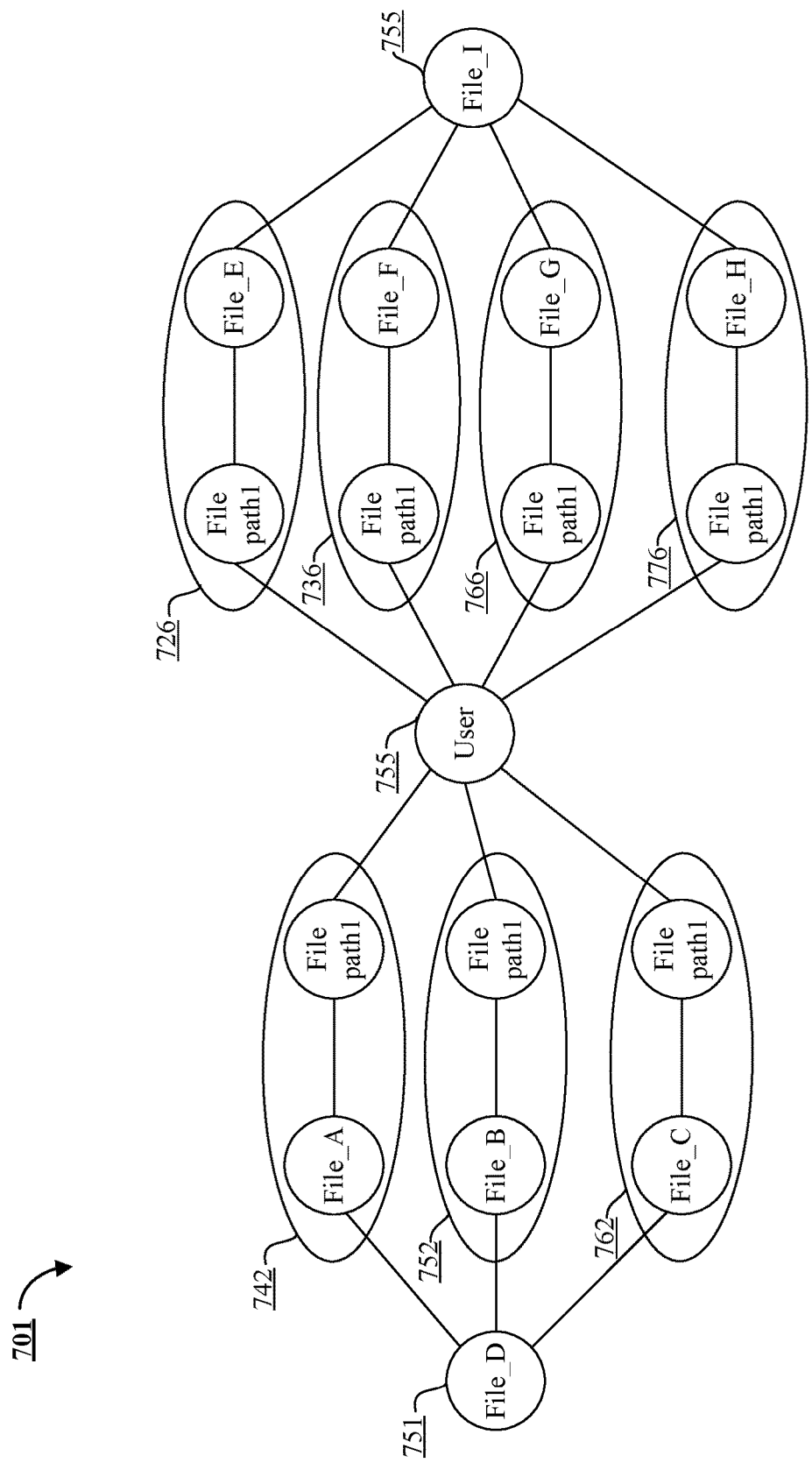
FIG. 7A is an example graph illustrating chains connected to same nodes on both ends.
Figure 7B:
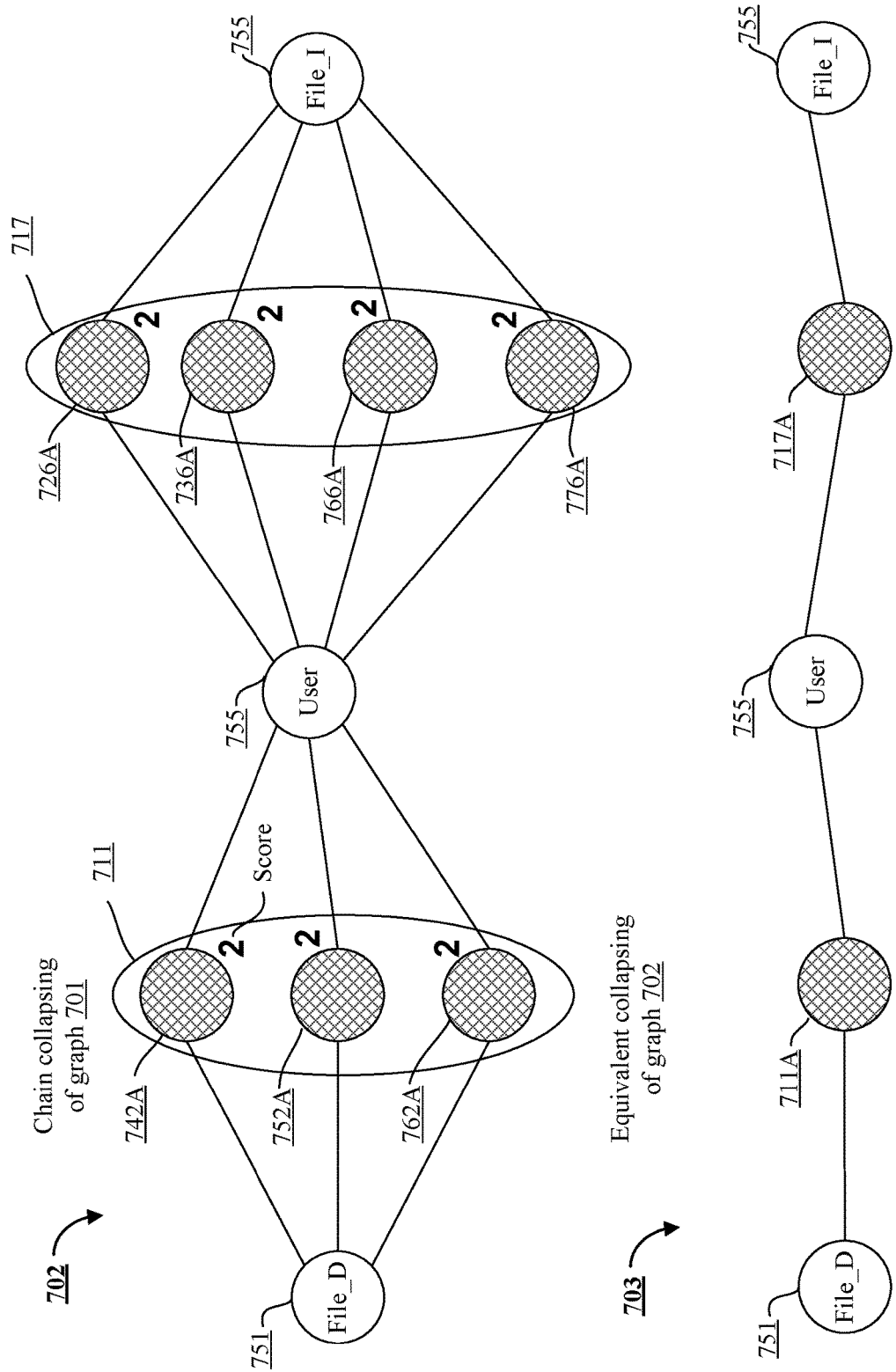
FIG. 7B illustrates chain collapsing of chains in the example graph of FIG. 7A followed by equivalent collapsing of chain-collapsed nodes.

In the following example, chain collapsing method is applied to a second type of chains which are connected to nodes on both ends. FIG. 7A presents a graph representing a computer network in which a user 755 starts seven processes, each connected a file. Three chains 742, 752, and 762 on the left side of the user node 755 in graph 701 are connected the same node 751 while four chains 726, 736, 766, and 776 on the right side of the user node 755 are connected to a node 755. All nodes in the chains in graph 702 have a degree 2 as there are no leaf nodes. Equivalence collapsing does not simplify the graph 702, however application of chain collapsing to graph 701 results in a graph 702 as shown in FIG. 7B.

The seven chains in graph 702 are collapsed to chain-collapsed nodes 742A, 752A, 762A, 726A, 736A, 766A and 776A respectively. The scores of chain-collapsed nodes are also shown besides respective chain-collapsed nodes. All chain-collapsed nodes have a score of 2 as they have two nodes in respective chains. Following chain collapsing, equivalence collapsing is applied to the graph 702 to further simplify the graph. Two groups 711 and 717 of equivalent nodes are identified. Resulting graph 703 shows equivalence nodes 711A and 717A.

Computer System

Figure 8:
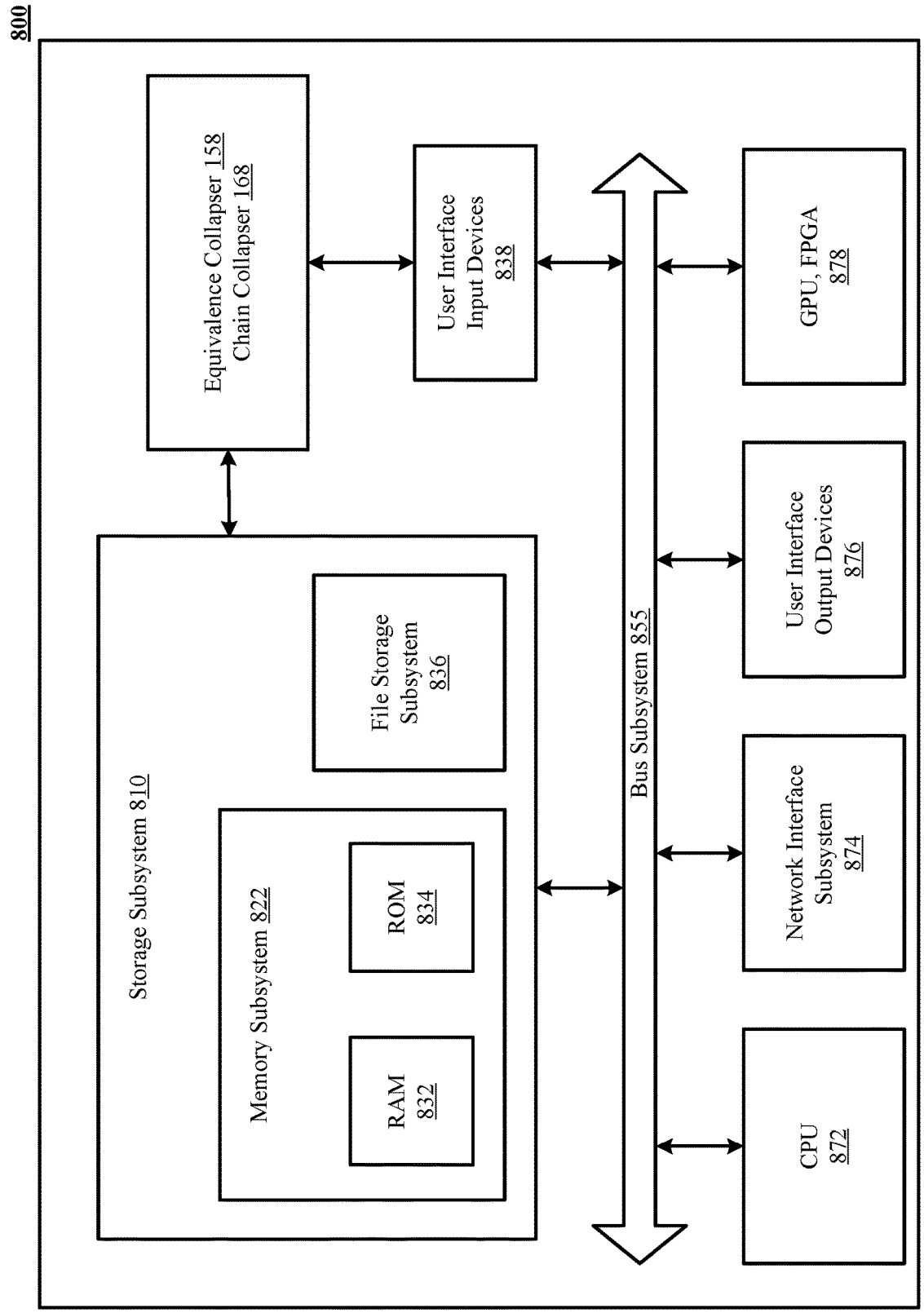
FIG. 8 is a simplified block diagram of a computer system that can be used to implement the technology disclosed.

FIG. 8 is a simplified block diagram of a computer system 800 that can be used to implement equivalence collapser 158 and chain collapser 168 of FIG. 1 to prevent aggregation of nodes of indicated interest in a security events graph. Computer system 800 includes at least one central processing unit (CPU) 872 that communicates with a number of peripheral devices via bus subsystem 855. These peripheral devices can include a storage subsystem 810 including, for example, memory devices and a file storage subsystem 836, user interface input devices 838, user interface output devices 876, and a network interface subsystem 874. The input and output devices allow user interaction with computer system 800. Network interface subsystem 874 provides an interface to outside networks, including an interface to corresponding interface devices in other computer systems.

In one implementation, the equivalence collapser 158 and chain collapser 168 of FIG. 1 is communicably linked to the storage subsystem 810 and the user interface input devices 838.

User interface input devices 838 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 800.

User interface output devices 876 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 800 to the user or to another machine or computer system.

Storage subsystem 810 stores programming and data constructs that provide the functionality of some or all of the modules and methods described herein. Subsystem 878 can be graphics processing units (GPUs) or field-programmable gate arrays (FPGAs).

Memory subsystem 822 used in the storage subsystem 810 can include a number of memories including a main random access memory (RAM) 832 for storage of instructions and data during program execution and a read only memory (ROM) 834 in which fixed instructions are stored. A file storage subsystem 836 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 836 in the storage subsystem 810, or in other machines accessible by the processor.

Bus subsystem 855 provides a mechanism for letting the various components and subsystems of computer system 800 communicate with each other as intended. Although bus subsystem 855 is shown schematically as a single bus, alternative implementations of the bus subsystem can use multiple busses.

Computer system 800 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 800 depicted in FIG. 8 is intended only as a specific example for purposes of illustrating the preferred embodiments of the present invention. Many other configurations of computer system 800 are possible having more or less components than the computer system depicted in FIG. 8.

Particular Implementations
Equivalence Collapsing

The technology disclosed relates to clutter reduction during graph presentation for security incident analysis.

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions to reduce clutter during graph presentation for security incident analysis of a computer network. The system scores nodes that are of indicated interest for security incident analysis and potentially collapsed by equivalence. The system aggregates and hides equivalent nodes that have matching degrees. The equivalent nodes are connected to matching nodes by matching edge types, and have scores below a first selected threshold. The system leaves interesting nodes having scores above the first selected threshold visible.

The system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The nodes in the graph of the computer network can represent network resources in the computer network.

The score for a particular node is increased when the particular node is connected to an edge representing a security incident alert.

During a threat hunting alert analysis, the system increases score for a particular node when the node represents a user entity type. The threat hunting analysis includes displaying nodes, representing users in a computer network, to a security analyst as potential threats.

During malware response alert analysis, the system increases the score for a particular node when the node represents a server type entity.

In response to receiving a node pinning message for a node corresponding to a particular user in a computer network for whom the threat hunting alert was generated, the system increases the score for the pinned node representing the particular user above the first selected threshold.

In response to receiving a node pinning message for a node corresponding to a particular server in a computer network for which the malware response alert was generated, the system increases the score for the pinned node representing the particular server above the first selected threshold.

Other implementations may include a non-transitory computer readable storage medium storing instructions executable by a processor to perform functions of the system described above. Yet another implementation may include a method performing the functions of the system described above.

A method implementation of the technology disclosed includes scoring nodes that are of indicated interest for security incident analysis and potentially collapsed by equivalence. The method includes aggregating and hiding equivalent nodes that have matching degrees. The equivalent nodes are connected to matching nodes by matching edge types, and have scores below a first selected threshold. The method leaves interesting nodes having scores above the first selected threshold visible.

Each of the features discussed in this particular implementation section for the system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Each of the features discussed in this particular implementation section for the first system implementation apply equally to the CRM implementation. As indicated above, all the system features are not repeated here and should be considered repeated by reference.

Chain Collapsing

A system implementation of the technology disclosed includes one or more processors coupled to memory. The memory is loaded with computer instructions to reduce clutter during graph presentation for security incident analysis. The system identifies chains of at least three nodes having degrees of 1 or 2, without branching from any node in the chain. The system collapses the identified chains into chain-collapsed single nodes.

The system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In one implementation, at least one of the chains is a whisker chain having at least three nodes and ending in a leaf node of degree 1.

The system scores a plurality of the chain-collapsed nodes that are of interest for security incident analysis for further equivalence collapsing, to prevent aggregation. The system aggregates and hides chain-collapsed nodes that are connected to matching nodes by matching edge types, and that have scores below a second selected threshold. The interesting chain-collapsed nodes having scores above the second selected threshold are left visible and not collapsed.

The system scores a particular chain-collapsed node by increasing the score of the particular chain-collapsed node when a chain length of the particular chain-collapsed node does not match chain length of chain-collapsed nodes connected to the matching nodes. The chain lengths of chain-collapsed nodes indicate number of nodes in respective chains.

Other implementations may include a non-transitory computer readable storage medium storing instructions executable by a processor to perform functions of the system described above. Yet another implementation may include a method performing the functions of the system described above.

A method implementation of the technology disclosed includes reducing clutter during graph presentation for security incident analysis. The method includes identifying chains of at least three nodes having degrees of 1 or 2, without branching from any node in the chain. The method includes collapsing the identified chains into chain-collapsed single nodes. The chain collapsed nodes can be further collapsed by applying the equivalence collapsing described above, and any or all of its features.

Each of the features discussed in this particular implementation section for the system implementation apply equally to this method implementation. As indicated above, all the system features referenced from the method are not repeated here and should be considered repeated by reference.

Other implementations may include a non-transitory computer readable storage medium storing instructions executable by a processor to perform the methods described above and any combination of associated features. Yet another implementation may include a system including memory and one or more processors operable to execute instructions, stored in the memory, to perform the methods described above and any combination of associated features. As indicated above, the referenced method features are not repeated here and should be considered repeated by reference. Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

What is claimed is:

1. A computer-implemented method of clutter reduction during display of nodes in a graph for security incident analysis of a computer network, including:
   automatically scoring nodes of indicated interest for security incident analysis, two or more of the nodes to be collapsed by equivalence, to prevent aggregation;
   aggregating by the equivalence and hiding from the display nodes based on the nodes:
     having matching degrees,
     being connected to matching nodes by matching edge types, and
     having scores below a first selected threshold,
   while leaving visible and not aggregated in the display interesting nodes having scores above the first selected threshold;
   during a threat hunting alert analysis, scoring a particular node by increasing the score for the particular node when the node represents a user entity type, wherein the threat hunting analysis includes displaying nodes, representing users in a computer network, to a security analyst as potential threats
   responsive to receiving a node pinning message for a node corresponding to a particular user in a computer network for whom the threat hunting alert was generated; and increasing the score for the pinned node representing the particular user above the first selected threshold.

2. The method of claim 1, wherein the nodes in the graph of the computer network represent network resources in the computer network.

3. The method of claim 1, further including scoring for a particular node by increasing the score for the particular node when the particular node is connected to an edge representing a security incident alert.

4. A computer-implemented method of clutter reduction during display of nodes in a graph for security incident analysis of a computer network, including:
   automatically scoring nodes of indicated interest for security incident analysis, two or more of the nodes to be collapsed by equivalence, to prevent aggregation;
   aggregating by the equivalence and hiding from the display nodes based on the nodes:
      having matching degrees,
      being connected to matching nodes by matching edge types, and
      having scores below a first selected threshold,
   while leaving visible and not aggregated in the display interesting nodes having scores above the first selected threshold;
   during malware response alert analysis, scoring a particular node by increasing the score for the particular node when the node represents a server entity type;
   responsive to receiving a node pinning message for a node corresponding to a particular server in a computer network for which the malware response alert was generated; and
   increasing the score for the pinned node representing the particular server above the first selected threshold.

5. A computer-implemented method of clutter reduction during display of nodes in a graph for security incident analysis, including:
   automatically identifying chains of at least three nodes having degrees of 1 or 2, without branching from any node in the chain; and
   collapsing for the display the identified chains into chain-collapsed single nodes;
   scoring a plurality of the chain-collapsed nodes of interest for security incident analysis, for further equivalence collapsing, to prevent aggregation;
   aggregating and hiding from the display chain-collapsed nodes that are connected to matching nodes by matching edge types, and that have scores below a second selected threshold, while leaving visible and not aggregated in the display interesting chain-collapsed nodes having scores above the second selected threshold; and
   scoring a particular chain-collapsed node by increasing the score of the particular chain-collapsed node when a chain length of the particular chain-collapsed node does not match chain length of chain-collapsed nodes connected to the matching nodes, wherein the chain lengths of chain-collapsed nodes indicate number of nodes in respective chains.

6. The method of claim 5, wherein at least one of the chains is a whisker chain having at least three nodes and ending in a leaf node of degree 1.

7. A non-transitory computer readable storage medium impressed with computer program instructions to reduce clutter during display of nodes in a graph for security incident analysis of a computer network, the instructions, when executed on a processor, computer implement a method comprising:
   automatically scoring nodes of indicated interest for security incident analysis, two or more of the nodes to be collapsed by equivalence, to prevent aggregation;
   aggregating by the equivalence and hiding from the display nodes based on the nodes:
      having matching degrees,
      connected to matching nodes by matching edge types, and
      having scores below a first selected threshold,
   while leaving visible and not aggregated in the display interesting nodes having scores above the first selected threshold;
   during a threat hunting alert analysis, scoring a particular node by increasing the score for the particular node when the node represents a user entity type, wherein the threat hunting analysis includes displaying nodes, representing users in a computer network, to a security analyst as potential threats
   responsive to receiving a node pinning message for a node corresponding to a particular user in a computer network for whom the threat hunting alert was generated; and
   increasing the score for the pinned node representing the particular user above the first selected threshold.

8. A non-transitory computer readable storage medium impressed with computer program instructions to reduce clutter during display of nodes in a graph for security incident analysis of a computer network, the instructions, when executed on a processor, computer implement a method comprising:
   automatically scoring nodes of indicated interest for security incident analysis, two or more of the nodes to be collapsed by equivalence, to prevent aggregation;
   aggregating by the equivalence and hiding from the display nodes based on the nodes:
      having matching degrees,
      being connected to matching nodes by matching edge types, and
      having scores below a first selected threshold,
   while leaving visible and not aggregated in the display interesting nodes having scores above the first selected threshold;
   during malware response alert analysis, scoring a particular node by increasing the score for the particular node when the node represents a server entity type;
   responsive to receiving a node pinning message for a node corresponding to a particular user in a computer network for whom the threat hunting alert was generated; and
   increasing the score for the pinned node representing the particular user above the first selected threshold.

9. A system including one or more processors coupled to memory, the memory loaded with computer instructions from the non-transitory computer readable storage medium of claim 7.

10. The system of claim 9, wherein the nodes in the graph of the computer network represent network resources in the computer network.

11. A system including one or more processors coupled to memory, the memory loaded with computer instructions from the non-transitory computer readable storage medium of claim 8.

* * * * *